No. 713,699.  
R. E. SHERMAN.  
HORSE STARTER.  
(Application filed Dec. 19, 1901. Renewed Oct. 17, 1902.)  
Patented Nov. 18, 1902.
(No Model.)
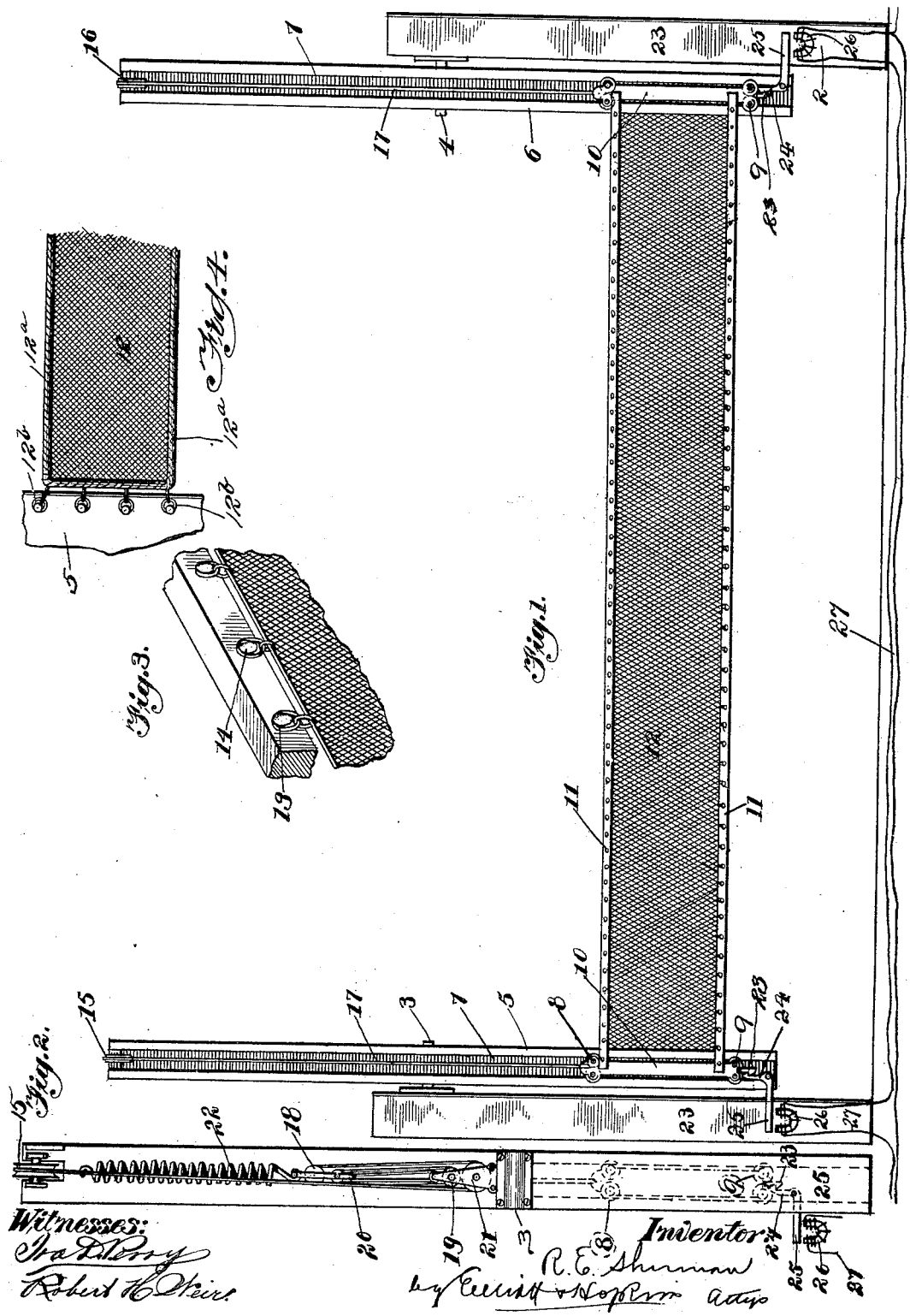

UNITED STATES PATENT OFFICE.

RICHARD E. SHERMAN, OF CHICAGO, ILLINOIS, ASSIGNOR TO JOHN S. MURRAY, OF CHICAGO, ILLINOIS.

HORSE-STARTER.

SPECIFICATION forming part of Letters Patent No. 713,699, dated November 18, 1902.

Application filed December 19, 1901. Renewed October 17, 1902. Serial No. 127,741. (No model.)

*To all whom it may concern:*

Be it known that I, RICHARD E. SHERMAN, a citizen of the United States, residing at Chicago, in the county of Cook and State of Illinois, have invented certain new and useful Improvements in Horse-Starters, of which the following is a full, clear, and exact specification.

My invention relates to that class of devices for starting race-horses especially designed for lining the horses up at the starting-post and generally comprising a gate or barrier arranged across the track; and my invention has for its primary object to provide an improved and efficient form of gate or barrier for this purpose which shall be so constructed and arranged that it may be lifted out of the way simultaneously with the starting-signal to permit the horses to pass and at the same time will be of a yielding character, whereby injury to both the horse and the gate will be avoided in the event that a horse should run against it.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a front elevation of my improved horse-starter, showing the gate or barrier in its lower position for obstructing the track. Fig. 2 is a side elevation of one of the gate-uprights looking from the opposite side to that presented in Fig. 1 and showing the same on an enlarged scale. Fig. 3 is an enlarged detail perspective view of a part of one of the longitudinal rails of the gate and the net, showing the manner of attaching the net to the gate; and Fig. 4 is a modification hereinafter described.

1 2 are permanent rigid posts or standards which are planted one on each side of the track at or contiguous to the starting-post or other place where it is desired to line up the horses preparatory to starting them. At or near the upper ends of these standards 1 2 are horizontal inwardly-projecting pivots 3 4, arranged one on each of the standards and located in line with each other, and on these pivots are journaled or swiveled two uprights or arms 5 6, respectively, in one side of each of which is formed a way or track 7, and in the ways or tracks of these uprights run trolleys 8 9, secured at the upper and lower ends of the end members 10 of the gate proper, whose longitudinal members or rails are shown at 11. Thus it will be seen that the gate 10 11 is capable of sliding vertically to the tops of the uprights 5 6, while the uprights themselves, with the gate supported thereon, are capable of rotary or pivotal movement on the pivots 3 4, thus providing for the deflection of the gate should a horse accidentally run against it.

The body of the gate proper, bounded by the end members 10 and side or longitudinal rails 11, may be constituted in any suitable way. In the example of the invention shown in the drawings a net 12 is stretched across the space between the horizontal rails and, if desired, may be removably attached thereto by clips or rings 13 and buttons 14.

At the upper ends of the uprights 5 6 are journaled pulleys 15 16, respectively, and over these pulleys pass cables 17, which are attached at one end to the upper ends of the gate end members 10, while their other ends are carried downwardly on the opposite sides of the uprights 5 6, as shown in Fig. 2, and after passing around a system of pulleys 18 19 are made fast to the hangers 20 of the pulleys 18 after the manner followed in elevator systems, the pulleys 18 being the traveling pulleys and the pulleys 19 being the fixed pulleys, whose hangers 21 are secured to the pivotal uprights 5 6.

The traveling pulleys 18 are secured to the lower ends of coil-springs 22, one of which is secured to each of the uprights 5 6, as illustrated in Fig. 2, so that when the gate proper is depressed into its lower position, as illustrated in Fig. 1, the spring will be stretched, and when in this position the gate may be locked by any suitable latch.

In the example of the invention shown in the drawings I employ two latches for this purpose, one at each end of the gate. One of these latches is illustrated in Fig. 2, and as they are the same in construction and operation the description of this one will suffice for both.

The lower end of each of the end members 10 of the gate is provided with a hook 23, as shown in this figure, which is engaged by a companion hook or latch 24, pivoted at 25 to the lower end of one of the uprights 5 6 in such a way that when the gate proper is pulled down to the lower ends of these uprights, as shown in Fig. 1, hooks 23, carried by gate members 10, will simultaneously engage their companion hooks or latches 24, and the gate will be thereby held in its lower position against the recoiling tendency of springs 22.

In order that the latches 24 may be simultaneously released for permitting the gate proper to shut upwardly under the recoil of the springs when the horses are started, each of the latches 24 is provided with an armature 25, projecting laterally therefrom into operative relation with electromagnets 26, connected by conductors 27, which extend to an operating-key (not shown) located at the judges' stand or other desired place. The latches 24 25, it will be seen, are carried on the pivotal uprights 5 6, so as to revolve with said uprights without releasing the hooks 23 in the event the gate should be accidently run into, but the magnets 26 are preferably carried on an independent support, such as the posts or standards 1 2. The armature-arms 25, projecting across from the uprights 5 6 and overlapping the standards 1 2, constitute a stop for arresting the pivotal uprights 5 6 and holding the armatures in proper position relatively to the magnets when the uprights return or descend after having been deflected as a result of a collision with the gate, it being understood that the parts are so proportioned and weighted as to make the lower ends of the uprights 5 6, with the gate proper thereon, slightly heavier than the upper ends, whereby the lower ends of the uprights will gravitate with a gradual and easy movement after being deflected.

In many instances it is desirable to entirely dispense with the longitudinal rails 11 and to have no connection between the uprights 5 6 excepting a net. This construction is shown in Fig. 4 and comprises the net 12, having a marginal rope 12$^a$, which at the ends of the net is secured to the uprights 5 6 by rings 12$^b$ or other suitable devices.

Having thus described my invention, what I claim as new therein, and desire to secure by Letters Patent, is—

1. In a horse-starter the combination of side arms pivoted on a horizontal axis, and a gate mounted on and movable lengthwise of said arms, substantially as set forth.

2. In a horse-starter the combination of side arms pivoted on a horizontal axis, a gate mounted on and movable lengthwise of said arms, and means carried by said arms for moving said gate lengthwise of said arms, substantially as set forth.

3. In a horse-starter the combination of side arms pivoted on a horizontal axis, a gate mounted on and movable lengthwise of said arms, means carried by said arms for moving said gate lengthwise thereof, and means carried with said arms for holding said gate against said movement, substantially as set forth.

4. In a horse-starter the combination of a vertically-movable gate, a motion-multiplying mechanism connected with said gate for elevating it, means exerting a normal tendency to impart motion to said motion-multiplying mechanism, and disengageable means for holding said gate depressed, substantially as set forth.

5. In a horse-starter the combination of a vertically-movable gate, motion-multiplying mechanism connected with said gate for elevating it, a spring connected with said motion-multiplying mechanism for imparting motion thereto and adapted to be stretched when the gate is depressed, and disengageable means for holding said gate depressed, substantially as set forth.

6. In a horse-starter the combination of a vertically-movable gate, motion-multiplying mechanism connected with each end thereof for elevating it, a latch located at each end of the gate for holding it depressed, means for simultaneously disengaging said latches, and means for imparting motion to said motion-multiplying mechanism when the latches are disengaged, substantially as set forth.

RICHARD E. SHERMAN.

Witnesses:
F. A. HOPKINS,
W. D. CROSS.